Dec. 7, 1937.                W. GUILHAUMAN                  2,101,676
                    ELASTIC FLUID TURBINE CONTROL
                          Filed Aug. 8, 1936
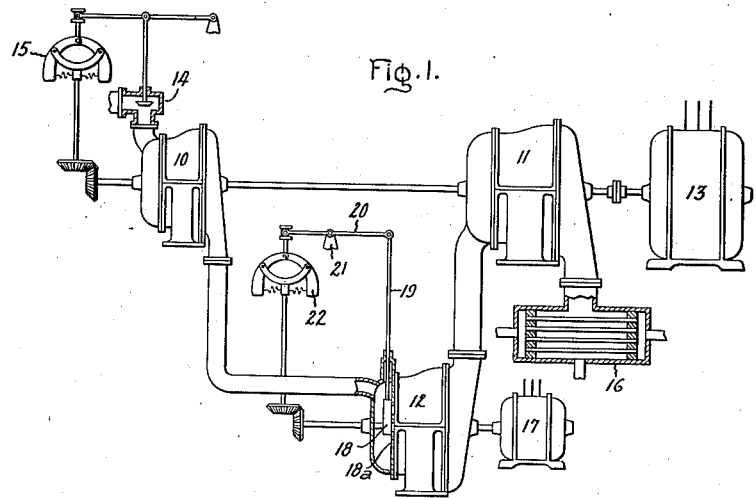
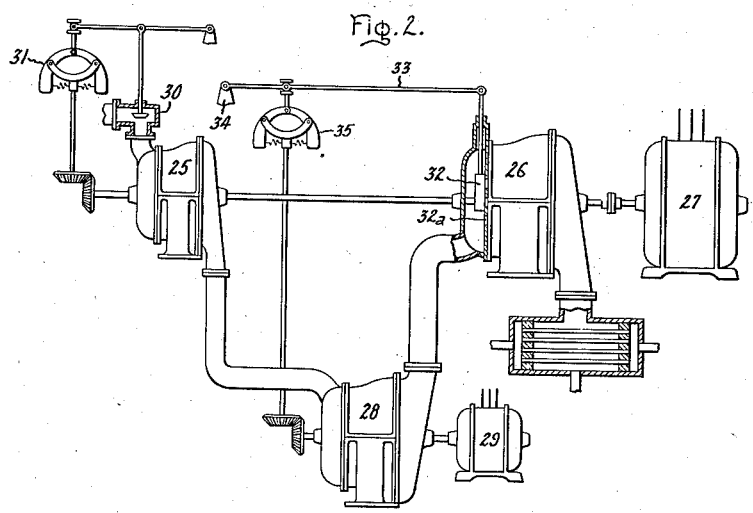
Inventor:
Werner Guilhauman,
by Harry E. Dunham
His Attorney.

Patented Dec. 7, 1937

2,101,676

UNITED STATES PATENT OFFICE 2,101,676

ELASTIC FLUID TURBINE CONTROL

Werner Guilhauman, Berlin-Steglitz, Germany, assignor to General Electric Company, a corporation of New York Application August 8, 1936, Serial No. 94,962
In Germany September 19, 1935

4 Claims. (Cl. 60—70)

The present invention relates to elastic fluid turbine controls, more specifically to the control of auxiliary turbines receiving elastic fluid from an intermediate stage of a main turbine.

The object of my invention is to provide an improved control arrangement whereby accurate control of the auxiliary turbine is obtained during varying load conditions of the main turbine or turbines and the auxiliary turbine. This is accomplished according to my invention by connecting the auxiliary turbine in series with a high pressure part and a low pressure part of the main turbine or turbines and by the provision of means for controlling the temperature or pressure drop across the auxiliary turbine. This means may be in the form of a throttle member or members for controlling the flow of elastic fluid to the first nozzle diaphragm of the auxiliary turbine or to the inlet or first nozzle diaphragm of the low pressure part receiving elastic fluid discharged from the auxiliary turbine.

For a better understanding of what I believe to be novel and my invention, attention is directed to the following description and the claims appended thereto in connection with the accompanying drawing.

In the drawing, Fig. 1 represents a turbine arrangement embodying my invention and Fig. 2 is a modification of Fig. 1.

The arrangement of Fig. 1 comprises a main turbine having a high pressure part 10 and a low pressure part 11. An auxiliary turbine 12 is connected in series between the high pressure part 10 and the low pressure part 11 to receive elastic fluid discharged from the high pressure part and to discharge elastic fluid into the low pressure part. The main turbine 10, 11 is coupled to an electric main generator 13. The flow of elastic fluid through the main turbine is controlled by a throttle valve 14 in the inlet conduit to the high pressure part 10, which valve is governed by means including a speed governor 15 driven from the turbine shaft and connected in known manner to the valve.

During operation an increase in demand for load output from the main turbine causes a decrease in speed whereby the flyweights of the speed governor move together and thereby effect opening of the throttle valve 14 to increase the flow of elastic fluid to the main turbine. Fluid discharged from the low pressure part 11 is condensed in a condenser 16 connected to the exhaust of the low pressure part 11.

The auxiliary turbine 12 is coupled with an auxiliary generator 17. In order to vary the load output of the auxiliary generator 17 in accordance with the varying load demand of the main generator, I provide an auxiliary governing mechanism for controlling the temperature and pressure drop across the auxiliary turbine 12. This means, in the example of Fig. 1, comprises a valve member 18 in the inlet of the auxiliary turbine for controlling the number of nozzle openings 18a. The valve member 18 has a stem 19 connected to the right-hand end of a lever 20 having an intermediate point supported on a fulcrum 21 and a left-hand end connected to a speed governor 22 driven from the shaft of the auxiliary turbine 12. The amount of elastic fluid flowing through the auxiliary turbine depends primarily upon the load output of the main turbine. With the provision of the auxiliary governing mechanism this load output is controlled in response to varying demand for load from the auxiliary generator 17. An increase in demand for load output from the auxiliary turbine generator 17 causes a decrease in speed and effects closing movement of the valve member 18. The valve member is so arranged that the flow of elastic fluid to some of the first stage nozzles 18a of the turbine 12 are closed whereas the others remain open. Closing of some of the nozzle passages consequently causes an increase in pressure ahead of the open nozzles and consequently an increased pressure drop across the auxiliary turbine resulting in an increased load output. From another viewpoint, the auxiliary governing mechanism changes the ratio of pressure drop between the high pressure part of the main turbine and the auxiliary turbine. In the aforementioned example an increase in load demand from the auxiliary turbine is effected by a reduction in pressure drop across the high pressure part of the main turbine and an increase in pressure or temperature drop across the auxiliary turbine.

The arrangement shown in Fig. 2 comprises a main turbine having a high pressure part 25 and a low pressure part 26 mechanically coupled with a generator 27 and connected in series by an auxiliary turbine 28 driving an auxiliary generator 29. The flow of elastic fluid to the high pressure part 25 is controlled by a governing mechanism including a valve 30 and a speed governor 31 corresponding to the valve 14 and the speed governor 15 of Fig. 1. In accordance with my invention auxiliary governing means are provided for controlling the pressure drop across the auxiliary turbine 28 by varying the ratio of pressure drop between the auxiliary turbine 28 and the main turbine low pressure part 26. It is to be understood that the inlet pressure to the auxiliary turbine and the exhaust pressure of the low pressure part 26 remain substantially constant. The pressure drop of the auxiliary turbine is controlled by valve means 32 for controlling the flow of elastic fluid to a plurality of inlet nozzles 32a to the low pressure part 26. The valve means 32 are connected to the right-hand end of a lever 33 which has a left-hand end supported on a fulcrum 34 and an intermediate point connected to a speed governor 35 driven from the turbine shaft of the auxiliary turbine. An increase in demand for load output from the auxiliary turbine causing a drop in speed, effects inward movement of the weights of the speed governor whereby the right-hand end of the lever 33 is raised, resulting in opening movement of the valve means 32. This opening movement increases the number of nozzles through which elastic fluid flows into the low pressure part 26 and thereby reduces the pressure ahead of these nozzles. Consequently with the inlet pressure of the auxiliary turbine remaining substantially constant, the pressure drop across the auxiliary turbine and therefore the load output of the auxiliary turbine are increased.

What I claim as new and desire to secure by Letters Patent of the United States, is:—

1. An elastic fluid turbine arrangement including the combination of a main turbine having a high pressure part and a low pressure part, an inlet valve for the high pressure part, a speed governing mechanism operated from the main turbine shaft for controlling the inlet valve, an auxiliary turbine connected in series between the high pressure part and the low pressure part to conduct all of the elastic fluid discharged from the high pressure part through the auxiliary turbine to the low pressure part, and means for automatically controlling the ratio of the pressure drop across the auxiliary turbine and the pressure drop across one of the main turbine parts in response to changes in load demand from either of said turbines.

2. An elastic fluid turbine arrangement including the combination of a main turbine having a high pressure part and a low pressure part, an inlet valve for the high pressure part, governing means for controlling the inlet valve, an auxiliary turbine connected in series between the high pressure part and the low pressure part, and auxiliary governing means for automatically controlling the pressure drop across the auxiliary turbine in response to changes in load demand from either of said turbines, said auxiliary governing means comprising a plurality of nozzles in the inlet of the auxiliary turbine and a governor for successively opening and closing said nozzles.

3. An elastic fluid turbine arrangement including the combination of a main turbine having a high pressure part and a low pressure part, an inlet valve for the high pressure part, a speed governing mechanism for controlling the inlet valve, an auxiliary turbine connected in series between the high pressure part and the low pressure part, and auxiliary governing means for controlling the pressure drop across the auxiliary turbine in response to changes in load demand from either of said turbines, said auxiliary governing means comprising a plurality of nozzles within the low pressure part and a valve member for opening and closing some of said nozzles.

4. An elastic fluid turbine arrangement including the combination of a first turbine and a second turbine, an inlet valve for the first turbine, means for controlling the inlet valve, a third turbine for driving auxiliaries connected in series between the first and the second turbine, and means for automatically controlling the pressure drop across the third turbine in response to changes in load demand from either of said first and second turbines, said means comprising a plurality of nozzles and a valve controlling the number of nozzles for conducting elastic fluid to one of the second and third turbines and a speed governor driven from the second turbine for controlling the nozzle valve.

WERNER GUILHAUMAN.